United States Patent
Pregel

(10) Patent No.: US 7,318,495 B2
(45) Date of Patent: Jan. 15, 2008

(54) POWER TRAIN ASSEMBLY HAVING A H-DRIVE CONFIGURATION

(76) Inventor: Vinko Pregel, 9 Longview Way N., Palm Coast, FL (US) 32137

( * ) Notice: Subject to any disclaimer, the term of this patent is extended or adjusted under 35 U.S.C. 154(b) by 0 days.

(21) Appl. No.: 11/305,252

(22) Filed: Dec. 19, 2005

(65) Prior Publication Data

US 2006/0131095 A1    Jun. 22, 2006

Related U.S. Application Data

(60) Provisional application No. 60/637,389, filed on Dec. 20, 2004.

(51) Int. Cl.
*B60K 17/16* (2006.01)
(52) U.S. Cl. ..................... 180/375; 180/374
(58) Field of Classification Search ............ 180/374, 180/375, 376, 383, 353, 359, 361; 475/200, 475/201, 202, 206
See application file for complete search history.

(56) References Cited

U.S. PATENT DOCUMENTS

| | | | |
|---|---|---|---|
| 1,991,575 A | * | 2/1935 | Reese .................. 180/292 |
| 2,083,059 A | | 6/1937 | Fageol |
| 2,118,810 A | | 5/1938 | Fageol |
| 2,118,811 A | * | 5/1938 | Fageol .................. 180/297 |
| 2,185,842 A | | 9/1940 | Flogaus |
| 2,262,456 A | | 8/1941 | Grater |
| 2,399,709 A | | 2/1946 | Schjolon |

* cited by examiner

*Primary Examiner*—Paul N. Dickson
*Assistant Examiner*—Robert A. Coker
(74) *Attorney, Agent, or Firm*—James F. Cottone

(57) ABSTRACT

A power train assembly having an H-drive configuration is described as having a number of transversely disposed components which transmit drive power from a transversely mounted drive power source to a transversely disposed rear wheel axle via a longitudinally disposed propeller shaft and a conventional axle-mounted differential. The H-drive configuration is ideally suited for use in low floor buses due to its longitudinally compact dimensions, and the resulting significant manufacturing and operating advantages are described. The H-drive configuration takes drive power source torque developed along a vehicle transverse axis, and after a direction changing, folded back arrangement applies the drive torque or power through a right angle gear box to the longitudinal propeller shaft for conventional coupling into the differential.

13 Claims, 2 Drawing Sheets

POWER TRAIN ASSEMBLY HAVING A H-DRIVE CONFIGURATION

This application claims the benefit of the U.S. Provisional Application No. 60/637,389 filed on Dec. 20, 2004.

TECHNICAL FIELD

The present invention relates generally to a power train assembly for motor vehicles driven by internal combustion engines, and more specifically to an H-drive power train configuration employed in vehicles whose engines are transversely mounted and are positioned rearwardly of the vehicle's rear traction axle. The present unique H-drive configuration delivers drive torque to the vehicle's rear traction wheels via a pair of drive shafts interconnected by a right angle gear box, and is ideally suited for use in buses wherein it provides significant operating and design advantages.

BACKGROUND

Motor vehicles with rear mounted engines are well known, and it is an especially common practice to use transversely mounted rear engines and their associated drive train configurations in passenger buses because of the distinct advantages this arrangement yields. Typically, transversely mounted engine/drive train arrangements positioned rearward of the vehicle's drive wheels give rise to large overhangs which produce a number of significant adverse effects. Large overhangs produce both structural and operating disadvantages and are especially undesirable in smaller buses with low floors.

Known power train configurations of conventional rear wheel drive vehicles with engine/transmission components rearward of the rear axle are of the T-drive and V-drive types. Generally, the T-drive configuration has an engine/transmission assembly with its axis mounted longitudinally (i.e., along the central fore-and-aft axis of the vehicle) with a prop shaft drivably connected to the input shaft of a rear differential gear box. The V-drive configuration has its engine/transmission/angle gear assembly mounted transversely (i.e., orthogonal to the vehicle's longitudinal axis) and rearward of and parallel to the drive axle, with a prop shaft drivably connected to a rear output shaft of an angle gear box and angled into an input shaft of a differential gear box. A major disadvantage of T-drive and V-drive configurations is that they produce extremely long rear overhangs of the vehicle, often times up to ⅓ of the length of the vehicle. Extremely long overhangs create, in prior art systems, a heavy loading situation of the rear axle through high weight and moment loads, and further create the situation where the front steering axle is not sufficiently loaded thereby creating very unsafe operating conditions for braking and steering. Additionally, long overhangs create a too small rear departure angle that reduces ground clearance at the rear of the vehicle.

Although the problems associated with buses having transversely mounted rear engines and drive trains are well known and have received a lot of design effort over the years, the resulting design compromises have produced arrangements that are deficient in ruggedness, simplicity of design, and cost effectiveness in manufacturing and operating.

Descriptions of typical prior art approaches to conventional V-drive and T-drive arrangements may be found in a number of U.S. patents.

U.S. Pat. No. 5,463,915 to Fuehrer et al. is illustrative of a large body of prior art employing a V-drive configuration. A shown best in FIG. 6 therein, the transversely mounted engine 24 provides drive torque to the rear axles 70 via a transmission and a driveshaft 62. It is not uncommon for V-drive arrangements of this type to produce significant overhangs, on the order of 110 inches.

U.S. Pat. No. 2,262,456 to Grater is illustrative of a large body of prior art using the T-drive configuration, as seen best in its FIG. 1. Note that the transverse rear power plant or engine 13 provides drive torque to dual rear traction wheels through a centrally disposed differential and longitudinally disposed propeller shaft 18. T-drive arrangements also typically exhibit large overehangs, on the order of 130 inches.

Additional teachings of related rear mounted vehicle drive train configurations are found in U.S. Pat. No. 4,535,867 to Botar, and U.S. Pat. No. 4,283,966 to Hagin.

While each of these prior art teachings show approaches that function more or less well for its intended purposes, they have not to date provided a clearly better drive train assembly idealy suited for use in buses, especially buses with low floors and high passenger space utilization. It is exactly these needs that the present invention admirably meets.

OBJECTS OF THE INVENTION

It is therefore a primary object of the present invention to provide an improved drive power train for vehicles having transversely mounted drive power sources.

An additional object of the present invention is to provide a compact drive power train wherein a significant number of the drive power train components are disposed along the same axis as that of the drive power source and are folded under the drive power source.

A further object of the present invention is to provide an H-drive power train configuration wherein the compact drive train components along a first axis are followed by a right angle drive gear box which couples output power or torque to a shaft which is orthogonal to the first axis.

A still further object of the present invention is to provide an H-drive power train configuration for use in rear traction wheel buses wherein the rearward mounted compact drive train advantageously provides low overhang forces and moments, and high departure angles.

In baseline and alternate preferred embodiments, a uniquely configured H-drive power train located rearward of the rear traction wheels of a motor vehicle is compactly arranged so as to optimally couple drive power from a transversely disposed, rear mounted drive power source, such as an internal combustion engine, to the transversely disposed rear traction wheel axle. The configuration is ideally adapted for use in buses where it provides significant advantages such as low overhang and high departure angles by virtue of its unique longitudinally compact arrangements, while providing for a conventional longitudinal propeller shaft for coupling into the vehicle's differential.

BRIEF DESCRIPTION OF THE DRAWINGS

Additional objects and advantages of the invention will become apparent to those skilled in the art as the description proceeds with reference to the accompanying drawings, wherein.

BEST MODE FOR CARRYING OUT THE INVENTION

Figure 1:
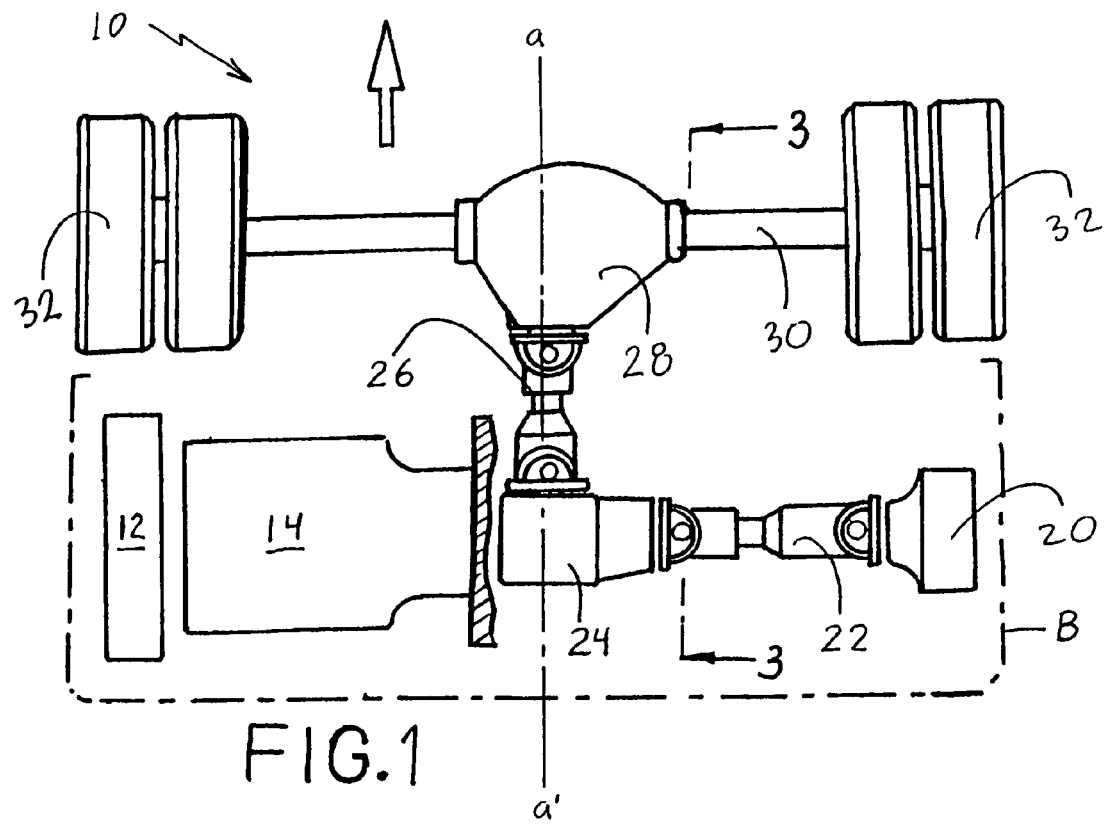
FIG. 1 is a top plan view, partially in section, of an H-drive configuration embodying the features of certain aspects of the present invention.
Figure 2:
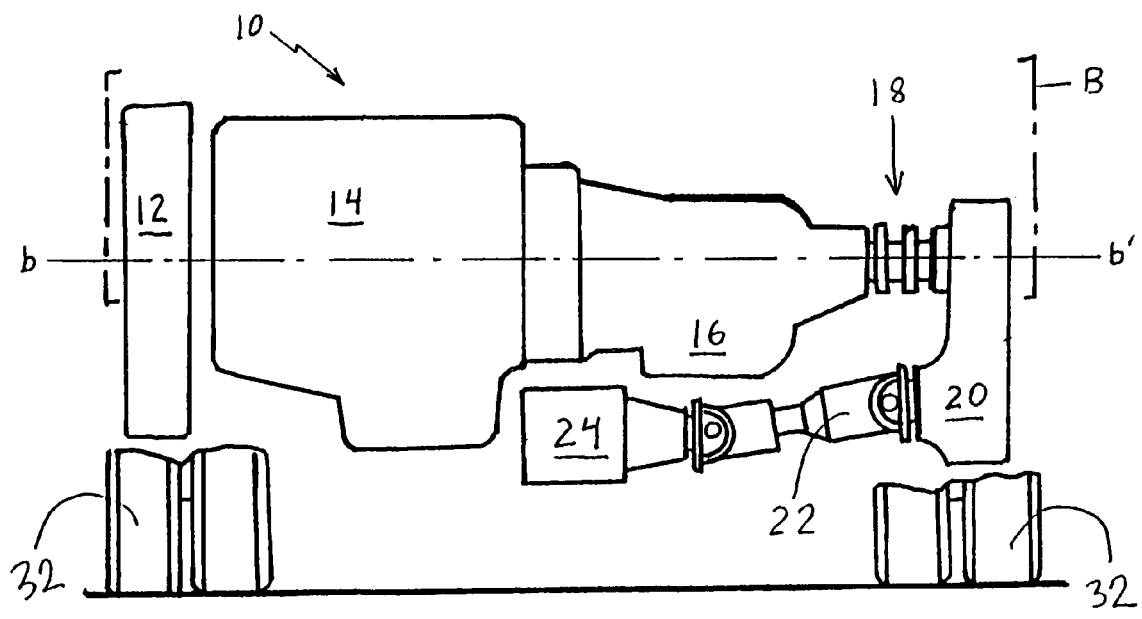
FIG. 2 is a rear view, also partly in section, of the H-drive configuration of FIG. 1 showing further features of certain aspects of the present invention.

Referring now to FIGS. 1 and 2 there are shown plan and rear views respectively of an H-drive power train configuration according to certain aspects of the present invention. By way of a brief overview, the partial plan view of FIG. 1 depicts the various drive train components oriented with respect to a centrally disposed vehicle longitudinal axis a-a', with the forward vehicle direction indicated by the arrow "=>" adjacent to the letter "a". The partial rear view of FIG. 2 depicts the various drive train components oriented with respect to a vehicle transverse axis b-b'.

An H-drive configuration assembly 10 includes an engine cooling package 12 operatively coupled to a transversely disposed internal combustion engine or other drive power source 14, and a change speed transmission 16. The change speed transmission 16 is coupled in a conventional manner to a transfer box 20 via a small angle joint 18 to compensate for movement between the two components. The transfer box 20 is constructed in a manner such that input drive torque, or drive power, can be transferred from a transversely disposed input shaft of transfer box 20 to a parallel, transversely disposed output shaft of the transfer box 20 in the opposite left-right direction by a sprocket/chain arrangement, or equivalent mechanisms. For simplicity of exposition, the various supporting, interconnecting, mounting structures, and the like, all of which are well known and conventional, are not shown.

A transversely disposed drive shaft 22 couples drive power from the output shaft of the transfer box 20 to a right angle drive gear box 24, and thereafter via a longitudinally disposed propeller or prop shaft 26 to a rear differential gear box 28. Drive torque is transferred in a conventional manner from an output shaft of the right angle gear box 24 through prop shaft 26 to the rear differential gear 28 and through a transverse rear axle assembly 30 to rear traction wheels 32. Among other advantages of the H-drive configuration disclosed, note that the centrally disposed differential 28 may be of any well known and readily commercially available type due to its not requiring any special or custom made input coupling arrangements. This is one of several cost effective manufacturing advantages the present H-drive configuration provides.

Note that the H-drive power train disclosed makes optimum use of a minimum volume of space by virtue of the relative location and positioning of its components. Also, the drive shaft and right angle gear box are located underneath the drive power source in a folded back arrangement making for a highly longitudinally compact configuration. It is significant that due to the unique design arrangement described, all drive train components may be standard, commercially available devices. This further contributes to low manufacturing costs, and low operating costs due to low maintenance and replacement parts costs.

Figure 3:
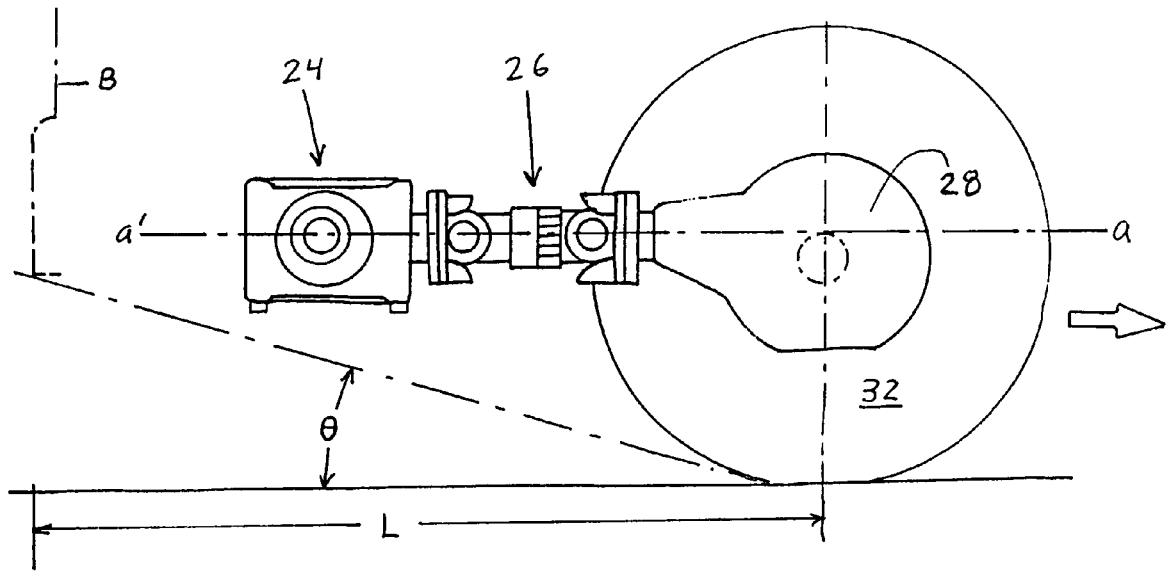
FIG. 3 is a side view in partial cross section of the H-drive power train assembly taken along the line 3-3' of FIG. 1.

The side view of FIG. 3 provides a clear showing of the low overhang and high departure angle θ afforded by the H-drive configuration described above. A low overhang dimension L achieved via the H-drive disclosed herein has been found in a fully functional prototype to be approximately 48 inches—a truly significant improvement over known prior art buses.

Figure 4:
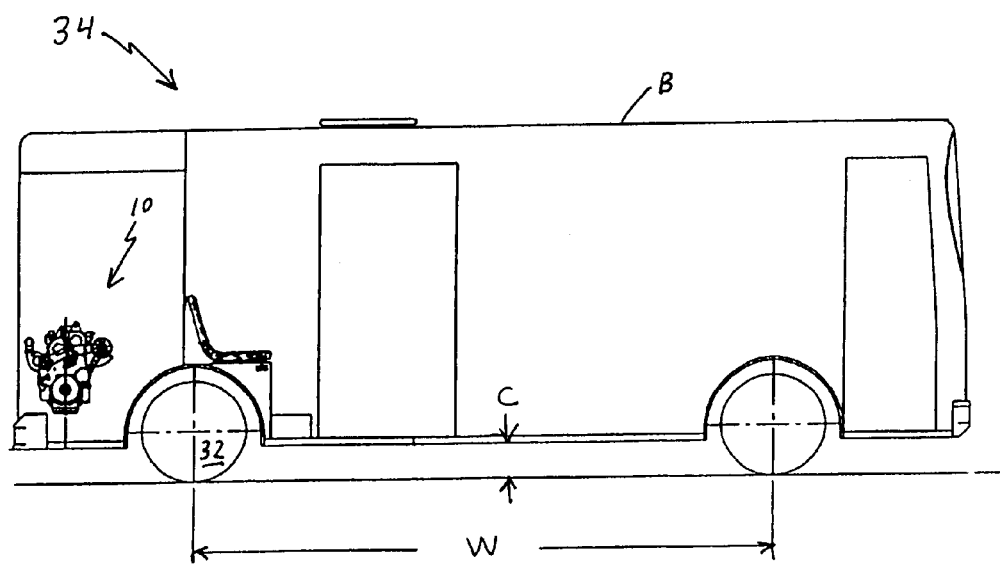
FIG. 4 is a highly schematic side elevation of a low floor passenger bus which incorporates the advantages of the H-drive power train configuration according to the present invention.

The highly schematic side elevation of FIG. 4 shows a prototype passenger bus 34 incorporating the improved H-drive power train configuration according to certain aspects of the present invention. Note that the low floor bus 34 so equipped may achieve a ground clearance dimension "C" on the order of 12 inches, and that a certain prototype may advantageously have a wheelbase W of 160 inches.

The outer skin or shell of the vehicle in certain preferred embodiments of a low floor passenger bus is shown in the various views of FIGS. 1-4 (mostly in broken lines) and is identified by the "B" designation. The various well known universal joints, and the like, are not individually labeled, also to avoid drawing clutter.

Although the invention has been described in terms of certain preferred embodiments and in certain illustrative uses, the invention should not be deemed limited thereto since other embodiments, modifications and end uses will readily occur to one skilled in the art. It is therefore to be understood that the appended claims are intended to cover all such modifications as fall within the true spirit and scope of the invention.

The invention claimed is:

1. An H-drive vehicle power train for a vehicle having rear traction wheels, a central longitudinal fore and aft axis, a transverse left-right axis and a transversely disposed drive power source located rearward of said rear traction wheels, comprising:
   (a) a transfer box having a transversely disposed input shaft and a transversely disposed output shaft and means for reversing the transverse direction of drive power between said transversely disposed input and transversely disposed output shafts;
   (b) a transversely disposed drive shaft, said transversely disposed input shaft being adapted to receive drive power from said drive power source and said transversely disposed output shaft being operatively connected to transmit drive power to said transversely disposed drive shaft;
   (c) a right angle gear box operatively connected to said transversely disposed drive shaft, and a longitudinally disposed propeller shaft connected to an output shaft of said right angle gear box and adapted to be connected to a differential to transmit drive power received from said drive power source via said differential to said rear traction wheels;
   (d) wherein said transversely disposed input shaft, transversely disposed output shaft, transversely disposed drive shaft and right angle gear box are configured to be located in a transverse plane of said vehicle with said transversely disposed drive shaft and said right angle gear box below said transversely disposed drive power source; and
   (e) whereby upon application of drive power from said drive power source to said transfer box, drive power is transferred to said rear traction wheels via said transversely disposed drive shaft, said right angle gear box, said longitudinal propeller shaft, and said differential.

2. The H-drive power train of claim 1 wherein said differential is substantially centrally located within said drive axle assembly.

3. The H-drive power train of claim 1 wherein said drive power source is an internal combustion engine and a change gear transmission.

4. The H-drive power train of claim 1 wherein said means for reversing is selected from the group consisting of chain/sprocket mechanisms, spur gears, bevel gears, and combinations thereof.

5. The H-drive power train of claim 4 wherein said transversely disposed output and input shafts are parallel to each other and said transversely disposed drive shaft is arranged to be folded back under said drive power source.

6. The H-drive power train of claim 5 further including a small angle joint for transferring drive power between said drive power source and said input shaft.

7. The H-drive power train of claim 6 wherein said right angle gear box is arranged to be substantially centrally located along a transverse axis in said transverse plane.

8. A method of providing drive power to the rear traction wheels of a bus having a central longitudinal fore and aft axis, a transverse left-right axis and a transversely disposed drive power source located rearward of said rear traction wheels, comprising:
  (a) providing a transversely disposed drive shaft and a transfer box having a transversely disposed input shaft and a transversely disposed output shaft and means for reversing the transverse direction of drive power between said transversely disposed input and output shafts, said transversely disposed input shaft being operatively connected to receive drive power and said transversely disposed output shaft operatively connected to transmit drive power to said transversely disposed drive shaft;
  (b) providing a right angle gear box operatively connected to said transversely disposed drive shaft and providing a longitudinally disposed propeller shaft connected between an output shaft of said right angle gear box and a differential to transmit drive power received from said drive power source to said rear traction wheels via said differential, wherein said transversely disposed input shaft, said transversely disposed output shaft, said transversely disposed drive shaft and said right angle drive gear box are located in a transverse plane with said transversely disposed drive shaft and said right angle gear box below said transversely disposed drive power source; and
  (c) whereby upon application of drive power from said drive power source to said transfer box, drive power is transferred to said rear traction wheels via said transversely disposed drive shaft, said right angle gear box, said longitudinal propeller shaft and said differential.

9. The method of claim 8, further including providing a means for reversing having internal components selected from the group consisting of chain-sprocket mechanisms, spur gears, bevel gears, and combinations thereof.

10. The method of claim 8 wherein said transversely disposed output shaft and said transversely disposed input shafts are parallel to each other and said transversely disposed drive shaft is folded back under said drive power source.

11. The method of claim 8 further including providing a small angle joint for transferring drive power between said drive power source and said input shaft.

12. The method of claim 8 wherein said right angle gear box is substantially centrally located along a transverse axis in said transversely disposed plane and is located underneath said drive power source.

13. A vehicle having a central longitudinal fore and aft axis and a transverse left-right axis comprising:
  a transverse rear axle assembly having rear traction wheels mounted thereon;
  a drive power source and a change speed transmission connected together and aligned with each other to extend in the direction of said transverse left-right axis, said drive power source and change speed transmission being located behind said transverse rear axle assembly and said rear traction wheels;
  a transfer box having a transversely disposed input shaft connected to said drive power source and a transversely disposed output shaft, said transfer box having means for reversing the transverse direction of drive power between said transversely disposed input and output shafts;
  a transversely disposed drive shaft connected to said transversely disposed output shaft;
  a longitudinally disposed propeller shaft;
  a right angle gear box below said drive power source and connected to said transversely disposed drive shaft to couple power from said transversely disposed output shaft to said longitudinally disposed propeller shaft; and
  a rear differential gear box connected to said transverse rear axle assembly and connected to said longitudinally disposed propeller shaft to transfer drive torque from an output shaft of said right angle gear box to said rear traction wheels.

* * * * *